July 17, 1923.

E. F. SMITH

IRON SPOOL FOR WIRE CABLES OF OIL WELLS

Filed Sept. 26, 1921

1,462,388

Inventor
E. F. Smith.
By Lynn L. Steele
Attorney

Patented July 17, 1923.

1,462,388

UNITED STATES PATENT OFFICE.

ELLSWORTH F. SMITH, OF DENVER, COLORADO.

IRON SPOOL FOR WIRE CABLES OF OIL WELLS.

Application filed September 26, 1921. Serial No. 503,293.

*To all whom it may concern:*

Be it known that I, ELLSWORTH F. SMITH, a citizen of the United States, residing at the city and county of Denver, State of Colorado, have invented certain new and useful Improvements in Iron Spools for Wire Cables of Oil Wells; and I do hereby declare the following to be a full, clear, and exact description of the same such as to enable others skilled in the art to which it appertains to make and use the same, reference being had to the accompanying drawings, forming a part hereof, and to the characters of reference marked thereon.

The object of this invention is to provide a spool for oil well cables which will withstand the hard usage of the business and may also be employed for easy rewinding of the cable after use.

Heretofore, the wire cables for use on oil wells have been wound on wooden spools, but these generally do not even stand up under the rough handling of shipping, the goods usually being shipped long distances. As a result the spools often have to be largely rebuilt before the cable can be rewound on them after use on a well. Since no special rewinding facilities are provided on these wooden spools, rewinding usually is a very laborious proceeding.

By means of the present invention all of these difficulties are overcome. The invention comprises a metal spool which preferably is of steel, and is composed of a drum or spindle having two heads secured thereto in a very secure manner. To facilitate rewinding, one head is provided with a sheave or a grooved pulley of the bull-wheel type and the other head is provided with a flat or crown pulley. A bull rope driven by the engine is slipped over the sheave or a flat belt is slipped over the other pulley, and a shaft is passed through the spool and supported on any convenient mounting, so that rewinding may be quickly accomplished by the power of the engine.

In the accompanying drawings wherein certain embodiments of the invention are disclosed:

Figure 1:
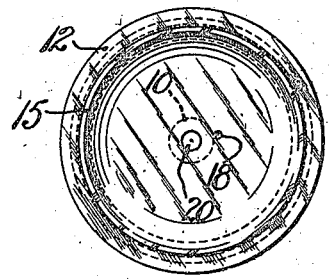
Fig. 1 is an end view of the spool taken from line 1—1 of Fig. 2.
Figure 2:
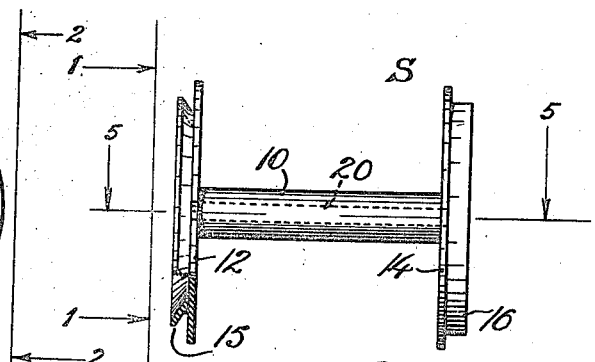
Fig. 2 is a side elevation of the spool taken from line 2—2 of Fig. 1.

The drum or spindle 10 of the spool which is indicated in general at S, is provided with two heads 12 and 14, head 12 being provided with a sheave or grooved pulley 15 for receiving a bull rope and the head 14 being provided with a flat or crown pulley 16 to receive a flat belt. The pulleys 15 and 16 are secured to their respective heads in any suitable manner, welding, as by means of the oxy-acetylene flame, being preferred. The diameters of these pulleys are sufficiently smaller than the diameters of the heads 12 and 14 that said heads serve as guides for the bull rope and belt and prevent them from riding up on the peripheries of the respective heads. One head is provided with an aperture 18 for securing the end of cable C when rewinding the same.

Figure 3:
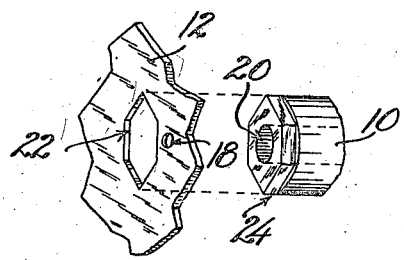
Fig. 3 is a detail in perspective of one form of construction.
Figure 4:
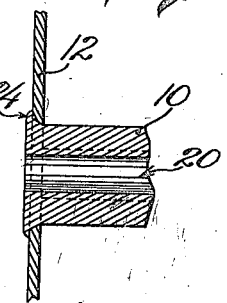
Fig. 4 is a section of the form of Fig. 3 assembled.
Figure 5:
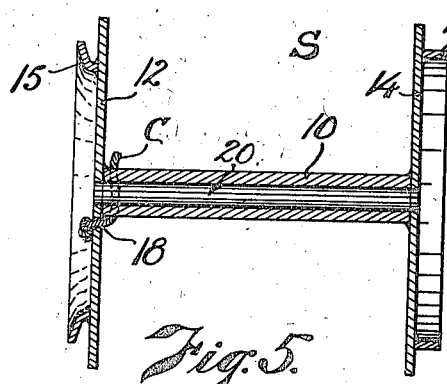
Fig. 5 is a section through a different form of construction.

The drum 10 is provided with an axial bore 20 for receiving a suitable shaft when mounting the spool for rewinding. Said drum is secured to the heads 12 and 14 in some manner which is sufficiently strong and permanent. This may be accomplished by means of a multisided aperture 22 in the respective head and a correspondingly shaped end 24 on the drum 10 (Fig. 3), the end 24 being passed through the aperture 22 and headed over on the outside of the respective head as indicated at 124, Fig. 4. A preferred form of construction is indicated in Fig. 5 where all the parts are welded together; this form permits of the use of cheap or discarded material for the drum 10 and thereby materially reduces the cost of manufacture.

Figure 6:
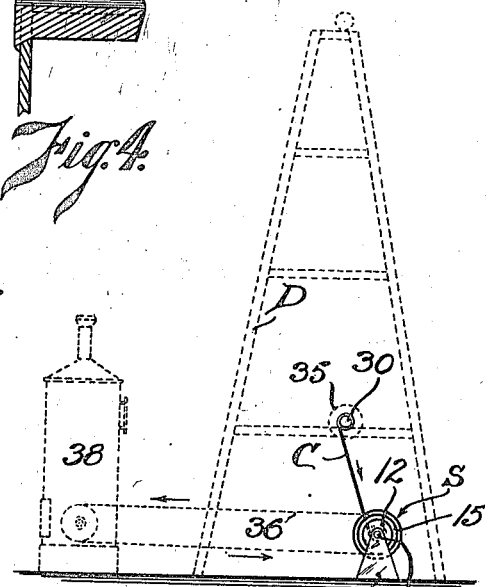
Fig. 6 is an elevation showing the device in rewinding position.

Fig. 6 represents the use of the device for rewinding the cable under which condition the pulley 16 or sheave 15 comes into play. A shaft 32, which may be a piece of pipe wedged tight in the bore 20, is mounted on any suitable supports 34, at a point under or adjacent the derrick D. The derrick carries a drum 30 provided with a bull wheel 35 onto which drum the cable C is wound when withdrawn from the well. The end of the cable C now on drum 30 is connected to spool S through medium of aperture 18 as shown, and a bull rope 36 driven from the engine 38, is passed over the sheave 15, or a flat belt also driven by the engine is passed over the pulley 16. The flat belt and the pulley 16 will be most serviceable particularly when it is better to position the spool at a distance from the derrick where certain belt driven parts are usually found (not illustrated). In this manner the cable C is quickly unwound from the derrick drum 30 by the power of the engine, whereas with wooden spools it has always been necessary to rotate the spool by hand which has been long and difficult.

From the foregoing it will be seen that several advantages of real value are obtained from the present invention. One, as just mentioned, is the rewinding by power instead of by hand. Another is the durability of the spool. Not only will a steel spool withstand the abuse received in shipping and deliver the cable in good condition, but it will also be ready for easy unwinding of the cable for use on the well and will be ready for rewind of the cable without repair, which are valuable features to the men in the field.

I claim:

1. A metal spool comprising a drum having a bore for ready reception of a shaft, a head integrally secured to each end of the drum, and a pulley integrally secured to one head for the reception of a rope or belt, said pulley having a diameter sufficiently smaller than the diameter of the head that said head will serve as a guide for the rope or belt and will prevent the same from riding up on the periphery of said head, the pulley itself being one-sided, the side of the respective head serving as the other side of the pulley.

2. A metal spool for cable comprising a drum having a bore for reception of a shaft, a head integrally secured to each end of the drum, and a pulley having one side of a groove integrally secured to the outer face of one head whereby the side of the head serves as the other side of the groove.

In testimony whereof I affix my signature.

ELLSWORTH F. SMITH.